US006475549B1

United States Patent
Ruhl

(10) Patent No.: US 6,475,549 B1
(45) Date of Patent: Nov. 5, 2002

(54) CAESAR SALAD DRESSING

(76) Inventor: Jeanne M. Ruhl, 210 Mary St., Downingtown, PA (US) 19335

( * ) Notice: Subject to any disclaimer, the term of this patent is extended or adjusted under 35 U.S.C. 154(b) by 0 days.

(21) Appl. No.: 09/707,019

(22) Filed: Nov. 6, 2000

(51) Int. Cl.$^7$ ................................................. A23L 1/24
(52) U.S. Cl. ...................... 426/605; 426/613; 426/602
(58) Field of Search ................................ 426/602, 613, 426/605

(56) References Cited

U.S. PATENT DOCUMENTS 4,451,493 A    5/1984    Miller et al.

OTHER PUBLICATIONS

Rombauer 1997 Joy of Cooking a Plume Book p360–365, p366, 596.*
Kimball 1996 The Cooks Bible Little, Brown & Company Boston MA p 113–118.*
Bracken 1986 The Complat I hate to cook Bok Bantom Books NY p 167–169.*
Gwen 1969 Modern Encyclopedia of Cooking Ferguson Publishing Co, Chicago p 1196–1207.*
Callahan 1938 Sunset's Salad Book Lane Publishing Co., San Francisco CA p 30–36.*
Parade Magazine Editors, 1978 The Parade Cookbook Simon and Schuster, New York p184–185, 202.*
Anderson, Jean, *The American Century Cookbook*, Clarkson N. Potter, New York, New York, pp. 264 and 265 (1997).
Blair, Eulalia C., *Salads & Salad Dressings for Foodservice Menu Planning*, Institutions/Volume Feeding Magazine, Boston, Massachusetts, p. 19 (1974).
Child, Julia, et al., *Julia and Jacques Cooking at Home*, Alfred A. Knopf, Inc., New York, New York, pp. 106–08 (1999).
*Cooking Light® Cookbook 1995*, Oxmoor House, Inc., Birmingham, Alabama, p. 187 (1994).
Farrell–Kingsley, Kathy, *The Woman's Day Cookbook: Great Recipes, Bright Ideas, and Healthy Choices for Today's Cook*, Penguin Books USA Inc., New York, New York, p. 392 (1995).
*The Good Housekeeping All–American Cookbook*, Dorling Kindersley Limited, New York, New York, pp. 270 and 271 (1987).
*New Cook Book*, Meredith Publishing Group, Des Moines, Iowa, p. 431 (1996).
Rosengarten, David, et al., *The Dean & Deluca Cookbook*, Random House, Inc., New York, New York, pp. 25 and 26 (1996).

* cited by examiner

Primary Examiner—Carolyn Paden
(74) Attorney, Agent, or Firm—Gary M. Cohen

(57) ABSTRACT

A Caesar salad dressing is provided with a creamy consistency using a combination of ingredients which includes extra virgin olive oil, lemon juice, Worcestershire sauce, salt, pepper, garlic, mayonnaise, milk, cream, Romano cheese, Dijon mustard and vinegar. The milk and cream are preferably combined in equal proportions (i.e., 50% each). The salt and pepper are optionally included. If used, the salt is preferably kosher salt and the pepper is preferably black pepper. The Romano cheese is preferably Locatelli and the vinegar is preferably red wine vinegar.

9 Claims, No Drawings

CAESAR SALAD DRESSING

BACKGROUND OF THE INVENTION

The present invention generally pertains to the variety of salad dressings known as "Caesar" salad dressings, and more particularly, to an improved composition for a so-called "creamy" style Caesar salad dressing.

The "traditional" Caesar salad dressing, which was originally created by Chef Caesar Cardini in 1924, is generally comprised of ingredients including extra virgin olive oil, raw (or coddled) egg, lemon juice, Worcestershire sauce, salt, pepper and garlic, in desired proportions.

Subsequently, a style for the Caesar salad dressing came to be developed which included ingredients for providing the dressing with a "creamy" consistency, in substitution for the egg which was used in the traditional recipe. The present invention is primarily directed to this latter, creamy-style Caesar salad dressing.

Known Caesar salad dressings of the creamy variety generally employ milk, or possibly sour cream, to provide the resulting dressing with its desired, creamy consistency. In practice, however, it has been found that the taste of such dressings is capable of significant improvement.

SUMMARY OF THE INVENTION

In accordance with the present invention, a Caesar salad dressing is provided with a creamy consistency using a combination of ingredients which includes mayonnaise, milk and cream. By combining these several ingredients, in proper proportion, it has been found that the resulting dressing will not only develop the desired consistency and appearance of a creamy Caesar salad dressing, but will do so while providing the resulting dressing with a significantly improved taste.

A preferred creamy-style Caesar salad dressing produced in accordance with the present invention is generally comprised of the major ingredients of a traditional Caesar salad dressing, including extra virgin olive oil, lemon juice, Worcestershire sauce (or anchovy), salt, pepper and garlic, in addition to ingredients for providing the resulting dressing with a creamy consistency including mayonnaise, milk and cream. The resulting, creamy Caesar salad dressing is further provided with ingredients including Romano cheese, Dijon mustard and vinegar. The milk and cream are preferably combined in equal proportions. The salt used is preferably kosher salt. The pepper used is preferably black pepper. The Romano cheese is preferably Locatelli. The vinegar used is preferably red wine vinegar.

For a further description of the creamy-style Caesar salad dressing of the present invention, reference is made to the following description of preferred embodiments of the invention.

DESCRIPTION OF PREFERRED EMBODIMENTS

A preferred creamy-style Caesar salad dressing produced in accordance with the present invention is generally comprised of ingredients including extra virgin olive oil, lemon juice, Worcestershire sauce, salt, pepper, garlic, mayonnaise, milk, cream, Romano cheese, Dijon mustard and vinegar. It is possible, although presently considered less preferred, to delete the salt and pepper from these ingredients.

The milk and cream are preferably combined in equal proportions (i.e., 50% each). Anchovy can be substituted for the Worcestershire sauce, if preferred. The salt, if used, is preferably kosher salt. The pepper, if used, is preferably black pepper. The Romano cheese is preferably Locatelli. The vinegar used is preferably red wine vinegar.

The foregoing ingredients are preferably combined in the proportions which follow:

| Ingredient | Proportion |
|---|---|
| extra virgin olive oil | at least 2 oz. |
| lemon juice | at least ½ oz. |
| Worcestershire sauce | no more than ½ oz. |
| salt | no more than ⅙ oz. |
| pepper | no more than 1/12 oz. |
| garlic | 3/12 to 5/12 |
| mayonnaise | 7 to 9 oz. |
| milk | at least 1 oz.* |
| cream | at least 1 oz.* |
| Romano cheese | 5½ to 6½ oz. |
| Dijon mustard | no more than ½ oz. |
| vinegar | at least ½ oz. |

*in equal proportion

Particularly preferred ingredients, and proportions for such ingredients, include the following:

| Ingredient | Proportion |
|---|---|
| extra virgin olive oil | 2 oz. |
| fresh lemon juice | ½ oz. |
| Worcestershire sauce | ½ oz. |
| kosher salt | ⅙ oz. |
| black pepper | 1/12 oz. |
| fresh garlic | ⅓ oz. |
| mayonnaise | 8 oz. |
| milk | 1 oz.* |
| cream | 1 oz.* |
| Locatelli (Romano) cheese | 6 oz. |
| Dijon mustard | ½ oz. |
| red wine vinegar | ½ oz. |

*in equal proportion

The foregoing recipes call for the milk and cream to be combined in equal (50%) proportions. This can be accomplished by mixing separate amounts of milk and cream, in equal proportions, or by using available mixtures of milk and cream, such as those which are commonly referred to as "half and half".

It will be understood that various changes in the details, ingredients and compositions which have been herein described and illustrated in order to explain the nature of this invention may be made by those skilled in the art within the principle and scope of the invention as expressed in the following claims.

What is claimed is:

1. A recipe for a creamy-style Caesar salad dressing, comprising ingredients combined in proportions substantially including:

| | |
|---|---|
| extra virgin olive oil | at least 2 oz. |
| lemon juice | at least ½ oz. |
| Worcestershire sauce | no more than ½ oz. |
| salt | no more than ⅙ oz. |
| pepper | no more than 1/12 oz. |
| garlic | 3/12 to 5/12 oz. |
| mayonnaise | 7 to 9 oz. |

-continued

| | |
|---|---|
| milk | at least 1 oz. |
| cream | at least 1 oz. |
| Romano cheese | 5½ to 6½ oz. |
| Dijon mustard | no more than ½ oz. |
| vinegar | at least ½ oz. |

2. The recipe of claim 1 wherein the salt is kosher salt.

3. The recipe of claim 1 wherein the pepper is black pepper.

4. The recipe of claim 1 wherein the milk and the cream are combined in equal proportions.

5. The recipe of claim 1 wherein the Romano cheese is Locatelli cheese.

6. The recipe of claim 1 wherein the vinegar is red wine vinegar.

7. The recipe of claim 1 wherein the ingredients are combined in proportions substantially including:

| | |
|---|---|
| extra virgin olive oil | 2 oz. |
| fresh lemon juice | ½ oz. |
| Worcestershire sauce | ½ oz. |
| kosher salt | ⅙ oz. |
| black pepper | 1/12 oz. |
| fresh garlic | ⅓ oz. |
| mayonnaise | 8 oz. |
| milk | 1 oz.* |
| cream | 1 oz.* |
| Locatelli (Romano) cheese | 6 oz. |
| Dijon mustard | ½ oz. |
| red wine vinegar | ½ oz. |

8. The recipe of claim 7 wherein the milk and the cream are combined in equal proportions.

9. A recipe for a creamy-style Caesar salad dressing consisting essentially of ingredients combined in proportions substantially including:

| | |
|---|---|
| extra virgin olive oil | at least 2 oz. |
| lemon juice | at least ½ oz. |
| Worcestershire sauce | no more than ½ oz. |
| salt | no more than ⅙ oz. |
| pepper | no more than 1/12 oz. |
| garlic | 3/12 to 5/12 oz. |
| mayonnaise | 7 to 9 oz. |
| milk | at least 1 oz. |
| cream | at least 1 oz. |
| Romano cheese | 5½ to 6½ oz. |
| Dijon mustard | no more than ½ oz. |
| vinegar | at least ½ oz. |

* * * * *